(12) United States Patent
Iwamoto et al.

(10) Patent No.: US 11,903,112 B2
(45) Date of Patent: Feb. 13, 2024

(54) LIGHTING MANAGEMENT SYSTEM, LIGHTING MANAGEMENT METHOD, AND PROGRAM

(71) Applicant: TOYOTA JIDOSHA KABUSHIKI KAISHA, Toyota (JP)

(72) Inventors: Kunihiro Iwamoto, Toyota (JP); Yuta Itozawa, Toyota (JP); Hirotaka Komura, Setagaya-ku Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/980,622

(22) Filed: Nov. 4, 2022

(65) Prior Publication Data

US 2023/0145045 A1 May 11, 2023

(30) Foreign Application Priority Data

Nov. 8, 2021 (JP) ................. 2021-182061

(51) Int. Cl.
| | |
|---|---|
| *H05B 47/10* | (2020.01) |
| *F21S 41/141* | (2018.01) |
| *H05B 47/11* | (2020.01) |
| *B60Q 1/24* | (2006.01) |
| *B60Q 1/14* | (2006.01) |
| *F21Y 115/10* | (2016.01) |

(52) U.S. Cl.
CPC ............. *H05B 47/11* (2020.01); *B60Q 1/143* (2013.01); *B60Q 1/24* (2013.01); *F21S 41/141* (2018.01); *B60Q 2300/3321* (2013.01); *F21Y 2115/10* (2016.08)

(58) Field of Classification Search
CPC ........ H05B 47/10; H05B 47/11; H05B 45/10; H05B 45/20; H05B 45/30; B60Q 1/143; B60Q 1/24; B60Q 2300/3321; F21S 41/141; F21Y 2115/10
See application file for complete search history.

(56) References Cited

U.S. PATENT DOCUMENTS

2012/0123637 A1* 5/2012 Funayama ................ G01J 3/36
356/326

FOREIGN PATENT DOCUMENTS

JP      2010-202094 A    9/2010

* cited by examiner

*Primary Examiner* — Jimmy T Vu
(74) *Attorney, Agent, or Firm* — Dinsmore & Shohl LLP

(57) ABSTRACT

The lighting management system includes: a judgement unit configured to judge whether or not a lighting state around a vehicle based on a first lighting apparatus and a second lighting apparatus meets a first reference for a light amount and a second reference for at least one of a lighting range, a lighting color, and a flashing state; a first control unit configured to control the light amount of at least one of the first lighting apparatus and the second lighting apparatus so that the lighting state is brought to meet the first reference; and a second control unit configured to control at least one of the lighting range, the lighting color, and the flashing state of at least one of the first lighting apparatus and the second lighting apparatus so that the lighting state is brought to meet the second reference.

7 Claims, 3 Drawing Sheets

LIGHTING MANAGEMENT SYSTEM, LIGHTING MANAGEMENT METHOD, AND PROGRAM

CROSS REFERENCE TO RELATED APPLICATIONS

This application is based upon and claims the benefit of priority from Japanese patent application No. 2021-182061, filed on Nov. 8, 2021, the disclosure of which is incorporated herein in its entirety by reference.

BACKGROUND

The present disclosure relates to a lighting management system, a lighting management method, and a program.

Japanese Unexamined Patent Application Publication No. 2010-202094 discloses a technique of making up for a shortfall in the amount of light from the streetlights by controlling the amount of light from the vehicle lights based on the result of detecting the amount of light from the streetlights and the vehicle lights with a light sensor installed in the streetlights.

SUMMARY

Even when the amount of light obtained by combining the lighting by the streetlights and the lighting by the vehicle lights is of a certain amount of light, depending on the state of the combined lights, visibility would be degraded.

The present disclosure has been made to solve the aforementioned problem and an object of the present disclosure is to provide a lighting management system, a lighting management method, and a program each adapted to improve visibility in a traffic environment.

A system according to an embodiment is a lighting management system configured to control at least one of a first lighting apparatus that a vehicle has and a second lighting apparatus installed in a traffic environment in which the vehicle travels, the lighting management system including:
  a judgement unit configured to judge whether or not a lighting state around the vehicle based on the first lighting apparatus and the second lighting apparatus meets a first reference for a light amount and a second reference for at least one of a lighting range, a lighting color, and a flashing state;
  a first control unit configured to control the light amount of at least one of the first lighting apparatus and the second lighting apparatus when the lighting state around the vehicle does not meet the first reference so that the lighting state around the vehicle is brought to meet the first reference; and
  a second control unit configured to control the lighting range, the lighting color, and the flashing state of at least one of the first lighting apparatus and the second lighting apparatus when the lighting state around the vehicle does not meet the second reference so that the lighting state around the vehicle is brought to meet the second reference.

A method according to an embodiment is a lighting management method of controlling at least one of a first lighting apparatus that a vehicle has and a second lighting apparatus installed in a traffic environment in which the vehicle travels, the lighting management method including steps of:
  judging whether or not a lighting state around the vehicle based on the first lighting apparatus and the second lighting apparatus meets a first reference for a light amount and a second reference for at least one of a lighting range, a lighting color, and a flashing state;
  controlling the light amount of at least one of the first lighting apparatus and the second lighting apparatus when the lighting state around the vehicle does not meet the first reference so that the lighting state around the vehicle is brought to meet the first reference; and
  controlling the lighting range, the lighting color, and the flashing state of at least one of the first lighting apparatus and the second lighting apparatus when the lighting state around the vehicle does not meet the second reference so that the lighting state around the vehicle is brought to meet the second reference.

A program according to an embodiment is a program for causing a computer to execute a lighting management method of controlling at least one of a first lighting apparatus that a vehicle has and a second lighting apparatus installed in a traffic environment in which the vehicle travels, the lighting management method including steps of:
  judging whether or not a lighting state around the vehicle based on the first lighting apparatus and the second lighting apparatus meets a first reference for a light amount and a second reference for at least one of a lighting range, a lighting color, and a flashing state;
  controlling the light amount of at least one of the first lighting apparatus and the second lighting apparatus when the lighting state around the vehicle does not meet the first reference so that the lighting state around the vehicle is brought to meet the first reference; and
  controlling the lighting range, the lighting color, and the flashing state of at least one of the first lighting apparatus and the second lighting apparatus when the lighting state around the vehicle does not meet the second reference so that the lighting state around the vehicle is brought to meet the second reference.

The present disclosure can provide a lighting management system, a lighting management method, and a program each adapted to improve visibility in a traffic environment.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

Hereinbelow, the present disclosure will be described through embodiments, but the disclosure according to the claims is not to be limited in any way by the embodiments described below. Further, not all of the components/structures described in the embodiments are necessarily indispensable for solving the problem.

Figure 1:
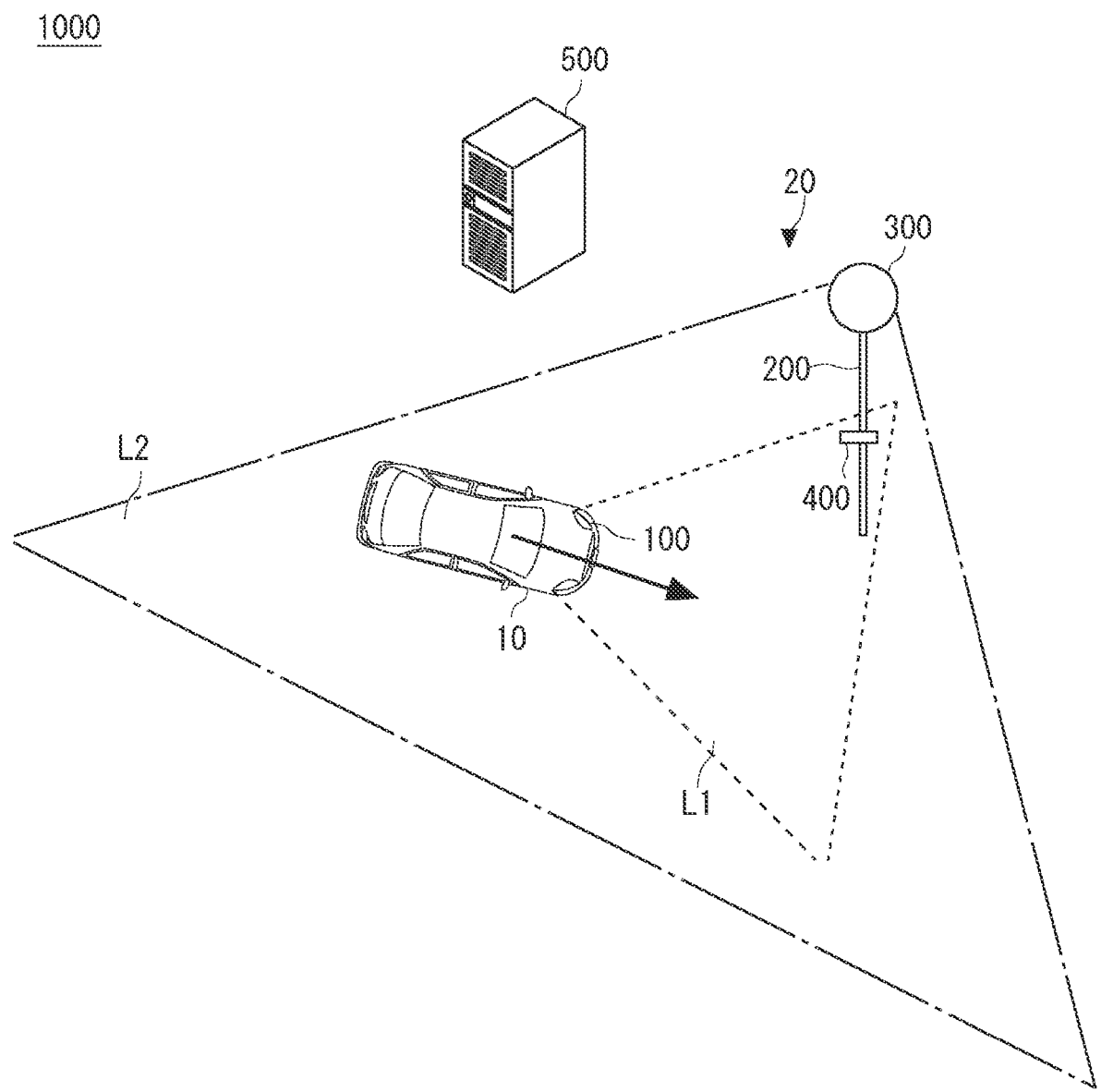
FIG. 1 is a schematic diagram showing a configuration of a lighting management system according to a first embodiment.

Hereinbelow, a lighting management system according to a first embodiment will be described with reference to the drawings. FIG. 1 is a schematic diagram showing an overview of a lighting management system 1000 according to the first embodiment. The lighting management system includes a lighting apparatus 100, a pole 200, a lighting apparatus 300, a light detection sensor 400, and a server 500.

Note that the function of the server 500, which will be described later, may be provided in the lighting apparatus 100 or the lighting apparatus 300. Therefore, a system which does not include the server 500 may also be included in the lighting management system 1000 according to the first embodiment.

The lighting apparatus 100 is a vehicle lighting mounted on a vehicle 10. The lighting apparatus 100 is also referred to as a first lighting apparatus. The lighting apparatus 100 generates a lighting L1 that illuminates the areas outside of the vehicle 10. The area surrounded by the dotted lines in FIG. 1 represents the lighting L1. The lighting apparatus 100 is, for example, a headlight, but an auxiliary light, a tail light, and the like may be included. In other words, the lighting L1 represents the lighting state of the lighting apparatus 100. The vehicle in which the lighting apparatus 100 is mounted may be a normal vehicle driven by a human driver or may be an autonomously-moving type vehicle. The lighting management system 1000 may include a plurality of lighting apparatuses 100.

The lighting apparatus 100 can change the amount of light of the lighting L1. Further, the lighting apparatus 100 can change at least one of the lighting range, the lighting color (the tone), and the flashing state (e.g. the flashing cycle and the flashing timing) of the lighting L1. The lighting apparatus 100 may change the size of its lighting range using a mirror or the like. The lighting apparatus 100 includes a plurality of LEDs (Light Emitting Diode), and the lighting color may be changed by varying the light emission intensities of LEDs. The lighting apparatus 100 may change the flashing cycle of the lighting L1 using a frequency converter or the like. Note that in the case where a lighting apparatus 300, which will be described later, is capable of changing the lighting range or the like of a lighting L2, which will be described later, the lighting apparatus 100 may not need to be able to change the lighting range or the like of the lighting L1.

The pole 200 is installed in a traffic environment 20 in which the vehicle 10 travels. The pole 200 has the lighting apparatus 300, which will be described later, and the light detection sensor 400, which will be described later, attached thereto. Note that the case in which the lighting apparatus 300, which will be described later, is not fixedly attached to the pole 200 is also included in the lighting management system 1000 according to the first embodiment. In such a case, the lighting management system 1000 does not have to be equipped with the pole 200.

The lighting apparatus 300 is disposed in the traffic environment 20. Specifically, the lighting apparatus 300 is attached to the pole 200. The lighting apparatus 300 is also referred to as a second lighting apparatus. The lighting apparatus 300 generates the lighting L2 that illuminates the traffic environment 20. In other words, the lighting L2 represents the lighting state of the lighting apparatus 300. The area surrounded by the single-dashed lines in FIG. 1 represents the lighting L2. The lighting apparatus 300 is, for example, a streetlight. The lighting management system 1000 may include a plurality of lighting apparatuses 300.

Note that the lighting range of the lighting L1 does not necessarily have to be included in the lighting range of the lighting L2. For example, the lighting range of the lighting L2 may be included in the lighting range of the lighting L1. Alternatively, a part of the lighting range of lighting L1 may be outside of the lighting range of the lighting L2. Similarly, a part of the lighting range of the lighting L2 may be outside of the lighting range of the lighting L1.

The lighting apparatus 300 can change the amount of light of the lighting L2. Further, the lighting apparatus 300 can change at least one of the lighting range, the lighting color (the tone), and the flashing state (e.g. the flashing cycle and the flashing timing) of the lighting L2. Note that in the case where the lighting apparatus 100 is capable of changing the lighting range or the like of the lighting L1, the lighting apparatus 300 may not need to be able to change the lighting range or the like of the lighting L2.

The light detection sensor 400 is attached to the pole 200. The light detection sensor 400 is a light-detectable image sensor. The light detection sensor 400 may detect the lighting L1, or the light obtained by combining the lighting L1 and the lighting L2. The light detection sensor 400 outputs the detection result to the server 500.

Instead of detecting the lighting L1 with the light detection sensor 400, the lighting apparatus 100 may send the control parameters for the amount of light and the lighting range of the lighting L1 to the server 500 to be described later. Instead of detecting the lighting L2 with the light detection sensor 400, the lighting apparatus 300 may send the control parameters for the amount of light and the lighting range of the lighting L2 to the server 500, which will be described later. In such a case, the lighting management system 1000 does not have to include the light detection sensor 400.

The server 500 controls at least one of the lighting apparatus 100 and the lighting apparatus 300. As described later, the server 500 can control, through a communication interface, at least one of the lighting range, the lighting color, and the flashing state, in addition to the amount of light of the lighting apparatus 100 and the like.

Figure 2:
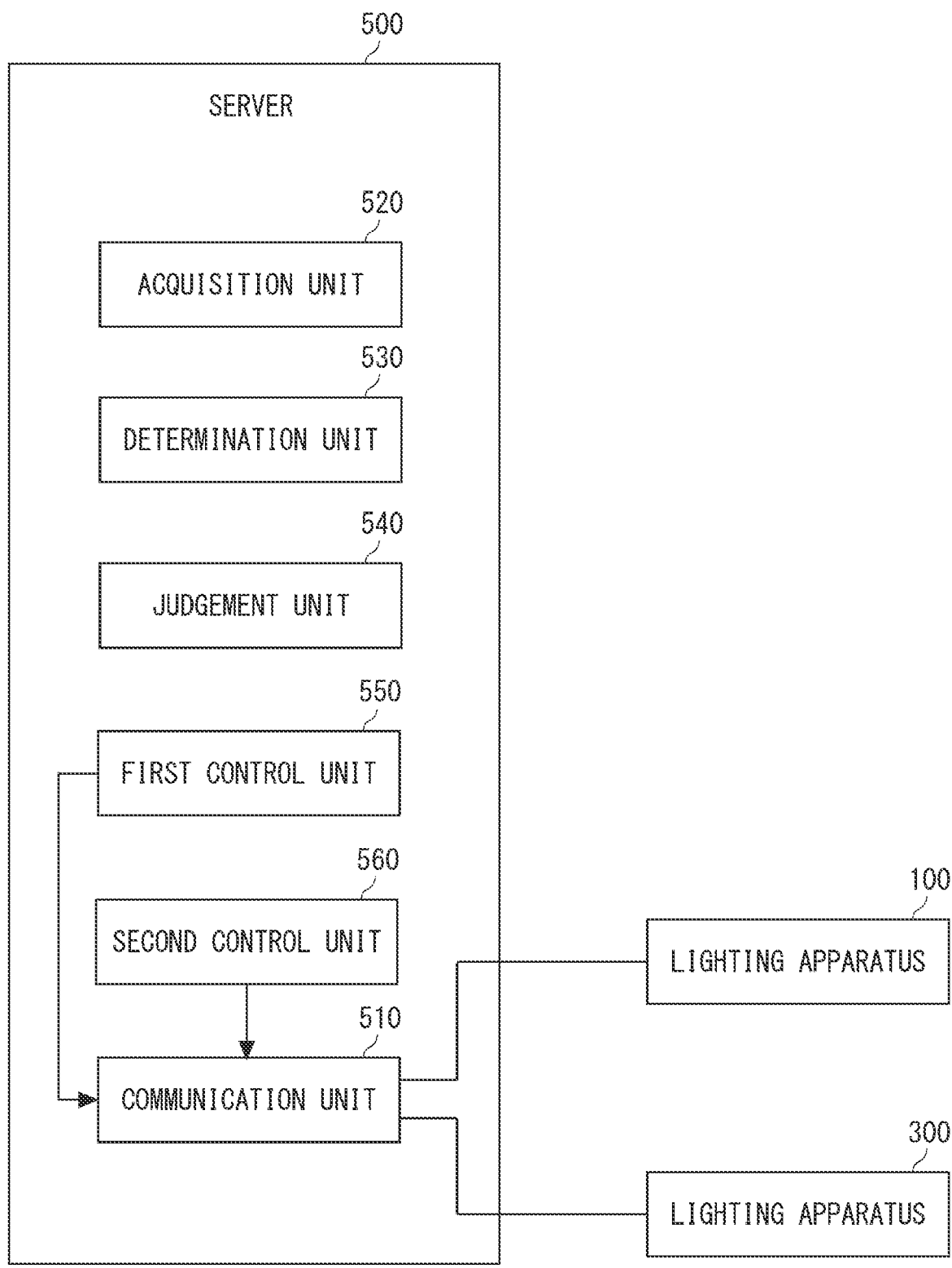
FIG. 2 is a block diagram showing a configuration of a server according to the first embodiment.

Next, a configuration of the server 500 will be described in detail with reference to FIG. 2. The server 500 includes a communication unit 510, an acquisition unit 520, a determination unit 530, a judgement unit 540, a first control unit 550, and a second control unit 560. The communication unit 510 is a communication interface, and the server 500 performs communication with the lighting apparatus 100 and the lighting apparatus 300 via the communication unit 510. Further, the server 500 may receive, via the communication unit 510, the detection result from the light detection sensor 400.

The server 500 includes a memory, a processor, and the like that are not shown. By causing the processor to execute the program stored in the memory, the server 500 implements the functions of the acquisition unit 520, the determination unit 530, the judgement unit 540, the first control unit 550, and the second control unit 560.

The acquisition unit 520 acquires the environmental information in the traffic environment 20. The environmental information includes, for example, information about the hours of day, information about the presence or absence of a pedestrian, and information about the presence or absence of a vehicle. Note that the environmental information may also include information about the number of pedestrians and information about the number of vehicles 10. The acquisition unit 520 may also acquire the information about the hours of day in accordance with the time information and the level of brightness around the vehicle. The acquisition unit 520 may acquire information about the pedestrians and the vehicles 10 from the result of the image captured by a camera (not shown) installed in the traffic environment 20. The acquisition unit 520 outputs the environmental information to the determination unit 530.

The determination unit 530 determines, based on the environmental information in the traffic environment 20, a first reference for the amount of light of the lighting state around the vehicle 10 based on the lighting L1 and the lighting L2. Further, the determination unit 530 determines, based on the environmental information in the traffic environment 20, a second reference for at least one of the lighting range, the lighting color (the tone), and the flashing state (e.g. the flashing cycle and the flashing timing) of the lighting state around the vehicle 10. The second reference for the flashing state may be the degree of matching of the flashing cycles. The degree of matching of the flashing cycles refers to matching of the flashing cycle of the lighting L1 and the flashing cycle of the lighting L2 and matching of the flashing timing of the lighting L1 and the flashing timing of the lighting L2.

The determination unit 530 may determine, for example, a reference for the part of the light in which the lighting L1 and the lighting L2 are superimposed on one another as regards the light amount, the area, the color, and the degree of the matching of the flashing cycles of the lighting L1 and the lighting L2. In such a case, the first reference is a reference for the total amount of light of the lighting L1 and the lighting L2. Further, the second reference is a reference for the area of the part of the light in which the lighting L1 and the lighting L2 are superimposed on one another, the color obtained by superimposing the lighting L1 and the lighting L2 on one another, and the degree of matching of the flashing timing of the lighting L1 and the lighting L2. Further, the determination unit 530 may determine a reference for the sum of the lighting range of the lighting L1 and the lighting range of the lighting L2.

Specifically, the determination unit 530 determines the first reference so that the amount of light is greater when pedestrians or vehicles are present in the traffic environment 20 than when they are not. Further, the determination unit 530 determines the first reference so that the amount of light is greater during the nighttime hours than the daytime hours. The determination unit 530 may determine the first reference and the second reference such that power consumption is suppressed while ensuring the required amount of light.

Further, specifically, the determination unit 530 determines the second reference such that the lighting color of the lighting state around the vehicle 10 is easily recognizable by a human in the case where there is a pedestrian present in the traffic environment 20. The determination unit 530 determines the second reference so that, for example, the wavelength of the light around the vehicle 10 includes a large amount of the component of 600 nm wavelength. Further, when there is a pedestrian in the traffic environment 20, the determination unit 530 may determine the second reference such that the flashing cycles of the lighting L1 and the lighting L2 match each other. When the flashing cycle of the lighting L1 and the flashing cycle of the lighting L2 match each other, the lighting state around the vehicle is a state in which visibility is satisfactory for pedestrians.

By determining the first reference, the lighting management system 1000 can illuminate the traffic environment 20 with sufficient amount of light. However, there is a problem that when the lighting range is small or the tone of the lighting is not appropriate (e.g. the wavelength does not include the component of 600 nm wavelength), or the cycle of the flashing state of the first lighting and the cycle of the flashing state of the second lighting do not match each other, visibility of the object that is illuminated lowers. The lighting management system 1000 can improve visibility of the object within the traffic environment 20 by determining the second environment described above.

First, the lighting management system 1000 can improve visibility without increasing the amount of light by appropriately determining the second reference. Therefore, there is a possibility that the lighting management system 1000 can reduce the power consumption in the lighting apparatus 100 and the lighting apparatus 300.

The judgement unit 540 judges whether or not the lighting state around the vehicle 10 based on the first lighting L1 and the second lighting L2 meets the first reference and the second reference. The judgement unit 540 may make a judgement based on the result of detection by the light detection sensor 400. For example, the judgement unit 540 acquires the lighting state of the lighting L1 and the lighting state of the lighting L2 from the result of detection by the light detection sensor 400. Then, in accordance with the acquisition result, the judgement unit 540 may estimate the lighting state of light obtained by combining the lighting L1 and the lighting L2 and determine whether or not the lighting state meets the first reference and the second reference.

When the lighting state around the vehicle 10 does not meet the first reference, the first control unit 550 controls the amount of light of at least one of the lighting L1 and the lighting L2 so that the lighting state around the vehicle is brought to meet the first reference. The first control unit 550 transmits a control signal to the lighting apparatus 100 or the lighting apparatus 300 via the communication unit 510.

When the lighting state around the vehicle 10 does not meet the second reference, the second control unit 560 controls the lighting range, the lighting color, and the flashing state of at least one of the lighting L1 and the lighting L2 so that the lighting state around the vehicle is brought to meet the second reference. The second control unit 560 transmits a control signal to the lighting apparatus 100 or the lighting apparatus 300 via the communication unit 510.

Figure 3:
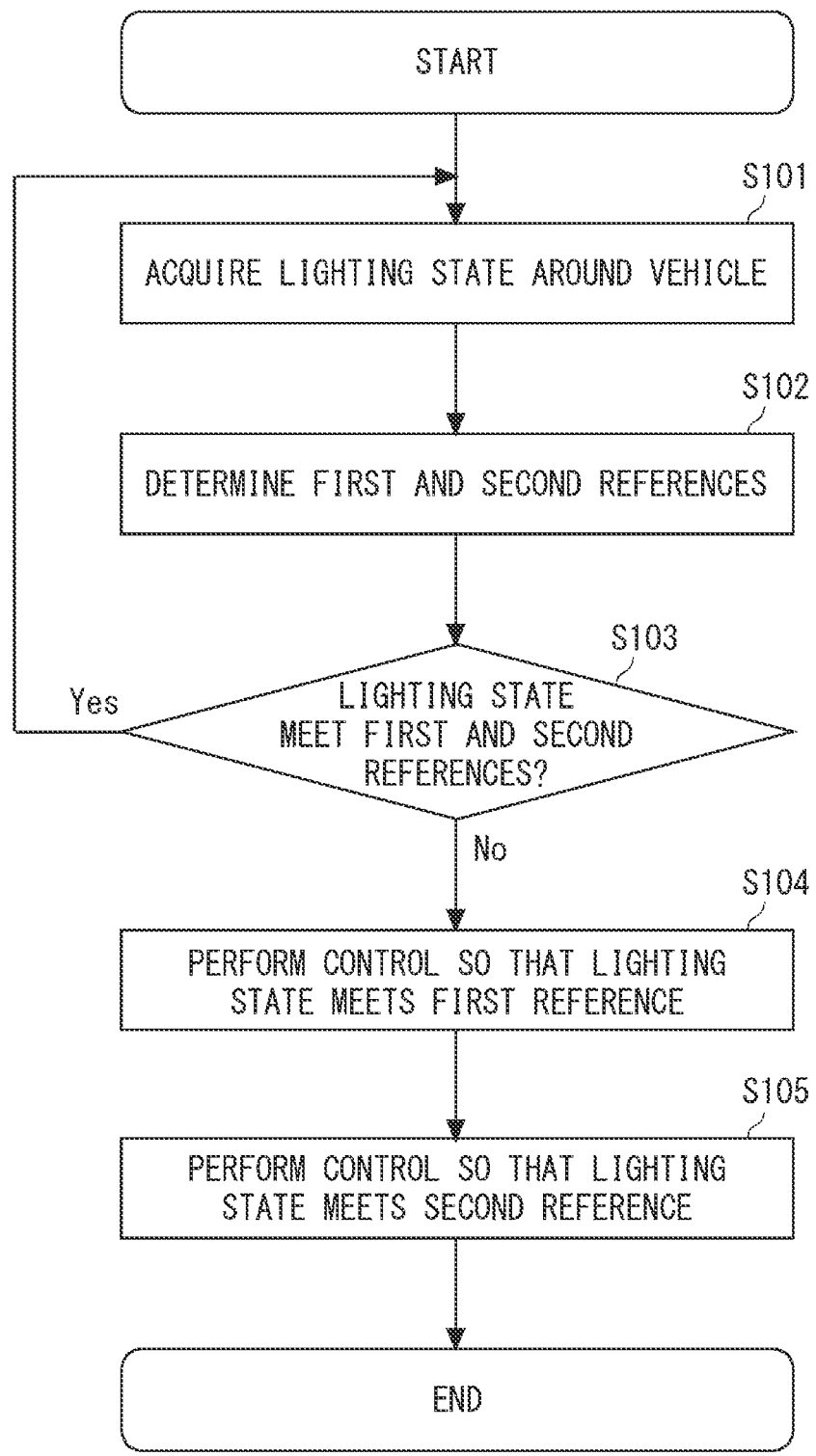
FIG. 3 is a flowchart showing flow of a lighting management method according to the first embodiment.

Next, a lighting a management method according to the first embodiment will be described with reference to FIG. 3. FIG. 3 is a flowchart showing flow of a lighting management method according to the first embodiment.

First, the acquisition unit 520 of the server 500 acquires the lighting state around the vehicle 10 from the sensing information of the light detection sensor 400 (Step S101). The lighting state around the vehicle 10 can be said as the lighting state of the traffic environment 20. The sensing information is, for instance, information about the amount of light, the lighting color (color), and the flashing cycle (light emission cycle).

Next, the determination unit 530 of the server 500 determines the first reference and the second reference in the traffic environment 20 based on the environmental information around the vehicle 10 (Step S102). For example, when a pedestrian is walking during the nighttime hours, the determination unit 530 brings the amount of light defined by the first reference to be greater than the amount of light when no pedestrian is walking. Further, when a pedestrian is walking during the nighttime hours, the determination unit 530 brings the lighting color defined by the second reference to be a color that is easily recognizable compared to the lighting color when no pedestrians are walking.

Next, the judgement unit 540 of the server 500 judges whether or not the lighting state of the light obtained by combining the lighting L1 and the lighting L2 meets the first reference and the second reference at the time when the vehicle 10 passes through the traffic environment 20 (Step S103). For example, the judgement unit 540 judges whether or not the amount of light obtained by combining the lightings is included in the range set as the first reference and whether or not the tone (the color) of the light obtained by combining the lightings meets the second reference.

When the judgement result in Step S103 is false (No in Step S103), the first control unit 550 of the server 500 controls at least one of the lighting L1 and the lighting L2 so that the lighting state around the vehicle is brought to meet the first reference (Step S104). The first control unit 550 changes the amount of light of either the lighting apparatus 100 or the lighting apparatus 300 so that, for example, the amount of light obtained by combining the lightings is included within the range set as the first reference. On the other hand, when the judgement result in Step S103 is true (Yes in Step S103), the processing returns to Step S101.

Next, the second control unit 560 of the server 500 controls as least either one of the lighting apparatus 100 and the lighting apparatus 300 so that the lighting state around the vehicle is brought to meet the second reference (Step S105). The second control unit 560 controls at least one of the lighting apparatus 100 and the lighting apparatus 300 so that the tone of light obtained by combining the lightings is brought to the tone that is easily recognizable to a human set as the second reference. The order of Step S104 and Step S105 may be reversed. After the processing of Step S105, the processing may be returned to that of Step S101 or the processing may be ended.

The lighting management system according to the first embodiment can control the lighting range, the tone, and the degree of matching of the frequencies of the two lights in addition to the amount of light in a traffic environment. Therefore, according to the lighting management system according to the first embodiment, visibility in a traffic environment can be improved.

Note that in the embodiments described above, while the present disclosure has been described as a hardware configuration, it is not to be limited thereto. It is also possible to implement each processing of the present disclosure by causing a CPU to execute a computer program.

The program includes instructions (or software codes) that, when loaded into a computer, cause the computer to perform one or more of the functions described in the aforementioned embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray (registered trademark) disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

The present disclosure is not limited to the aforementioned embodiments, and can be modified as appropriate without departing from the gist of the present disclosure.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A lighting management system configured to control at least one of a first lighting apparatus that a vehicle has and a second lighting apparatus installed in a traffic environment in which the vehicle travels, the lighting management system comprising:
    a judgement unit configured to judge whether or not a lighting state around the vehicle based on the first lighting apparatus and the second lighting apparatus meets a first reference for a light amount and a second reference for at least one of a lighting range, a lighting color, and a flashing state;
    a first control unit configured to control the light amount of at least one of the first lighting apparatus and the second lighting apparatus when the lighting state around the vehicle does not meet the first reference so that the lighting state around the vehicle is brought to meet the first reference; and
    a second control unit configured to control the lighting range, the lighting color, and the flashing state of at least one of the first lighting apparatus and the second lighting apparatus when the lighting state around the vehicle does not meet the second reference so that the lighting state around the vehicle is brought to meet the second reference.

2. The lighting management system according to claim 1, further comprising a determination unit configured to determine the first reference and the second reference based on environmental information in the traffic environment.

3. The lighting management system according to claim 2, wherein the environmental information includes at least one of information about the hours of day, information about presence or absence of a pedestrian, and information about presence or absence of a vehicle.

4. The lighting management system according to claim 3, wherein
    the second reference includes a reference for the lighting color, and
    the determination unit determines the second reference such that the lighting color is easily recognizable by a human in a case where there is the pedestrian present in the traffic environment.

5. The lighting management system according to claim 3, wherein
    the second reference includes a reference for the flashing state, and
    the determination unit determines the second reference such that the flashing cycle of the first lighting apparatus and the flashing cycle of the second lighting apparatus match each other in a case where there is the pedestrian present in the traffic environment.

6. A lighting management method of controlling at least one of a first lighting apparatus that a vehicle has and a second lighting apparatus installed in a traffic environment in which the vehicle travels, the lighting management method comprising steps of:

judging whether or not a lighting state around the vehicle based on the first lighting apparatus and the second lighting apparatus meets a first reference for a light amount and a second reference for at least one of a lighting range, a lighting color, and a flashing state;

controlling the light amount of at least one of the first lighting apparatus and the second lighting apparatus when the lighting state around the vehicle does not meet the first reference so that the lighting state around the vehicle is brought to meet the first reference; and controlling the lighting range, the lighting color, and the flashing state of at least one of the first lighting apparatus and the second lighting apparatus when the lighting state around the vehicle does not meet the second reference so that the lighting state around the vehicle is brought to meet the second reference.

7. A non-transitory computer readable medium storing a program for causing a computer to execute a lighting management method of controlling at least one of a first lighting apparatus that a vehicle has and a second lighting apparatus installed in a traffic environment in which the vehicle travels, the lighting management method comprising steps of:

judging whether or not a lighting state around the vehicle based on the first lighting apparatus and the second lighting apparatus meets a first reference for a light amount and a second reference for at least one of a lighting range, a lighting color, and a flashing state;

controlling the light amount of at least one of the first lighting apparatus and the second lighting apparatus when the lighting state around the vehicle does not meet the first reference so that the lighting state around the vehicle is brought to meet the first reference; and controlling the lighting range, the lighting color, and the flashing state of at least one of the first lighting apparatus and the second lighting apparatus when the lighting state around the vehicle does not meet the second reference so that the lighting state around the vehicle is brought to meet the second reference.

* * * * *